UNITED STATES PATENT OFFICE.

JOHN HARRIS, OF LAKEWOOD, OHIO, ASSIGNOR TO CARBO-OXYGEN COMPANY, OF PITTSBURGH, PENNSYLVANIA, A CORPORATION OF DELAWARE.

PROCESS OF CUTTING METALS WITH GASEOUS FUEL.

1,425,856. Specification of Letters Patent. Patented Aug. 15, 1922.

No Drawing. Continuation of application Serial No. 62,442, filed November 19, 1915. This application filed August 16, 1920. Serial No. 403,839.

*To all whom it may concern:*

Be it known that I, JOHN HARRIS, a citizen of the United States, residing at Lakewood, in the county of Cuyahoga and State of Ohio, have invented a certain new and useful Improvement in Processes of Cutting Metals with Gaseous Fuel, of which the following is a full, clear, and exact description.

This invention relates to a process of cutting metals with gaseous fuel and has for its general object to enable the operation to be accomplished in a particularly efficient and economical manner.

As is well known, acetylene is the gas most generally known and used for the purpose of cutting metals with blowpipes. But it is expensive of production and requires for its combustion in blowpipes a large proportion of substantially pure oxygen. By means of my invention, I am enabled to cut metals efficiently and at a great saving of expense as compared with the use of acetylene for this purpose.

In the practice of my invention, I use hydrogen as a base and enrich the same by passing it through a suitable saturator containing a light, volatile liquid hydrocarbon, or hydrocarbon derivative such as alcohol, benzene or ether. The hydrogen will preferably be contained in a tank or cylinder under a pressure of 1800 to 2000 lbs. per square inch, the tank being provided with a pressure regulator whereby the hydrogen may be delivered to the saturator under any desired pressure—say from 10 to 20 lbs. per square inch. The saturator may be of any suitable type, such, for instance, as shown in my application No. 62,442, filed November 19, 1915, and which application discloses the preparation of hydrogen enriched with the vapor of a hydrocarbon and the use of the mixture thus produced in a blow pipe for cutting purposes. This application, therefore, is in some respects a continuation of the aforesaid earlier filed application.

By delivering the hydrogen through the saturator, it will issue from the latter charged with a sufficient proportion of hydrocarbon or derivative thereof so that, when mingled with substantially pure oxygen and ignited it will produce visible cones within the preheating jets of cutting blow pipes, thus enabling the operator to apply the said jets to the work in a manner to secure maximum efficiency in cutting metal.

The gaseous fuel which I employ is not only far cheaper than acetylene, but may be employed for cutting purposes where it is impracticable to compress the hydrogen into tanks, as it need be under a pressure merely sufficient to cause it to pass through the saturator and thence to the blowpipe, without intervening storage.

In carrying out my process a cutting torch or blowpipe is supplied with hydrogen charged with the vapor of the volatile liquid hydrocarbon and is mingled in such torch or blowpipe with substantially pure oxygen, thus producing a pre-heating mixture. This mixture is delivered through the preheating slot or jets and ignited. The vapors mingled with the hydrogen will impart sufficient luminosity to the preheating cone or cones to enable the latter to be applied to the metal in such manner as to secure rapid and efficient preheating thereof. After the metal has been preheated, oxygen will be directed upon the part thus preheated and will cut the metal in the usual manner.

Among the advantages of my process are the following:

(*a*) I am enabled to cut metal with a gas which is nearly as cheap as hydrogen, and the hydrogen constituent whereof has hitherto been allowed to escape as waste in plants where oxygen is manufactured by the electrolytic process or by the alkali process.

(*b*) I am enabled to cut with a gas having a hotter preheating flame than hydrogen alone, resulting in a quicker preheating and a quicker cutting operation than can be secured by hydrogen.

(*c*) I am enabled to cut with a gas which will produce a readily visible cutting flame or cone the temperature whereof is higher than that produced by hydrogen.

(*d*) I am enabled to cut with the heating of a narrow zone of metal, and hence with a less consumption of gas and metal than is possible with the ordinary process, employing acetylene alone.

Having thus described my invention, what I claim is:

1. The process of cutting metal which consists in directing against the same one or more preheating jets consisting each of an ignited mixture of substantially pure oxygen with hydrogen charged with the vapor of a volatile liquid hydrocarbon or hydrocarbon derivative, and directing against the metal thus preheated a jet or stream of substantially pure oxygen.

2. The process of cutting metal which consists in directing against the same one or more preheating jets consisting each of an ignited mixture of substantially pure oxygen with a gas having a non-luminous flame and a fluid capable of imparting visibility to such flame, and directing against the metal thus preheated a jet or stream of substantially pure oxygen.

3. The process of cutting metal which consists in directing against the same one or more preheating jets consisting each of an ignited mixture of substantially pure oxygen with hydrogen and a fluid capable of rendering such jets visible, and directing against the metal thus preheated a jet or stream of substantially pure oxygen.

In testimony whereof, I hereunto affix my signature.

JOHN HARRIS.